United States Patent [19]

Copenhafer et al.

[11] Patent Number: 5,194,176
[45] Date of Patent: Mar. 16, 1993

[54] PEROXYGEN LAUNDRY BLEACH

[75] Inventors: William Copenhafer, Yardley, Pa.; Basil A. Guiliano; William A. Hills, both of Lawrenceville; Charles V. Juekle, Belle Mead, N.J.; Stephen Tomko, Trenton, N.J.

[73] Assignee: FMC Corporation, Philadelphia, Pa.

[21] Appl. No.: 679,366

[22] Filed: Apr. 2, 1991

Related U.S. Application Data

[63] Continuation-in-part of Ser. No. 505,800, Apr. 6, 1990, abandoned.

[51] Int. Cl.$^5$ .............................................. C01B 15/10
[52] U.S. Cl. ........................ 252/186.27; 252/186.3; 252/186.43; 252/99; 423/413
[58] Field of Search ................... 252/186.27, 186.28, 252/186.29, 186.30, 186.31; 423/413 P

[56] References Cited

U.S. PATENT DOCUMENTS

| | | | |
|---|---|---|---|
| 3,951,838 | 4/1976 | Jayawant et al. | 252/99 |
| 4,105,827 | 8/1978 | Brichard et al. | 428/403 |
| 4,117,087 | 9/1978 | Dillenburg et al. | 423/275 |
| 4,126,717 | 11/1978 | Mazzola | 427/220 |
| 4,156,039 | 5/1979 | Klebe et al. | 427/215 |
| 4,178,351 | 12/1979 | Klebe et al. | 423/415 P |
| 4,194,025 | 3/1980 | Klebe et al. | 427/215 |
| 4,321,301 | 3/1982 | Brichard et al. | 428/403 |
| 4,421,669 | 12/1983 | Brichard | 252/186.25 |
| 4,526,698 | 7/1985 | Kuroda et al. | 252/99 |
| 4,759,956 | 7/1988 | Amer et al. | 427/213 |
| 4,966,762 | 10/1990 | Pfeffer et al. | 423/415 P |
| 4,970,058 | 11/1990 | Hills et al. | 423/415 P |

*Primary Examiner*—Richard D. Lovering
*Assistant Examiner*—Joseph D. Anthony
*Attorney, Agent, or Firm*—R. E. Elden; P. C. Baker; R. L. Andersen

[57] ABSTRACT

The invention provides a process to coat dry particles comprising sodium carbonate perhydrate to provide a stable dry particulate solid which releases hydrogen peroxide when contacted with an aqueous solution. The coated particles are readily soluble in water and/or stable when formulated into a solid detergent.

4 Claims, No Drawings

PEROXYGEN LAUNDRY BLEACH

This is a continuation-in-part of U.S. application Ser. No. 505,800 filed Apr. 6, 1990 now abandoned.

FIELD OF THE INVENTION

The present invention is a solid composition which releases hydrogen peroxide in the presence of water and is stable when incorporated into solid household and laundry detergents.

It is well known that peroxygenated compounds can be used as bleaching compounds in detergent powder mixtures. In the usual household detergents, sodium perborate tetrahydrate is generally used as a bleaching compound even though it is phytotoxic, as it is relatively stable to decomposition in a powdered detergent medium. However, sodium perborate tetrahydrate has the disadvantage of dissolving too slowly, particularly in cold water. Sodium perborate monohydrate, on the other hand, dissolves rapidly, however, the particles are very fragile and generally break down to a dust. Both forms are environmentally undesirable because they add 1 mole of boron compound to the environment for each mole of active oxygen.

To rectify this disadvantage, it has been suggested that powdered detergents be used in a mixture with other peroxygen compounds, notably alkali metal percarbonates, perphosphates and peroxymonosulfates, which have suitable dissolution rates. These peroxygen compounds, particularly percarbonates, decompose too quickly in the powdered state, especially if they are stored in a humid atmosphere. Furthermore, the moisture and other constituents in the cleaning compounds accelerate this decomposition.

It has been suggested that particles of peroxygen compounds be coated by various compounds, such as trona (U.S. Pat. No. 4,105,827); sodium silicate (U.S. Pat. No. 3,951,838); sodium perborate plus sodium silicate (U.S. Pat. No. 4,194,025); boric acid (U.S. Pat. No. 4,321,301); wax (U.S. Pat. No. 4,421,669); a polymer latex (U.S. Pat. No. 4,759,956); sodium silicate plus a chelate (U.S. Pat. No. 4,117,087); and wax plus a fatty acid (U.S. Pat. No. 4,126,717). Many of these treatments show some improvement in short term storage stability in a humid environment.

In general, these processes are based on either 1) physically coating the sodium carbonate peroxide with a compound, such as, trona, boric acid and the like to prevent the peroxygen compound (for example, sodium carbonate perhydrate) from physically contacting the other compounds in the detergent composition as a spacer, or 2) coating the peroxygen compound with a vapor barrier such as a wax or a polymer. Neither of these processes has been successful as a mere physical coating permits water vapor to penetrate the particle to initiate decomposition, while coating with a vapor-impervious barrier retards the rate of solution of the particle so much that the compound is unusable.

SUMMARY OF THE INVENTION

The present invention overcomes the difficulties of the prior art by providing a process for preparing a storage-stable compound comprising:

a) suspending substantially dry particles comprising a sodium carbonate perhydrate containing between 0.1% and 3% by weight diphosphonic acid or salt and between 1 and 5 moles of anhydrous sodium carbonate for each mole of available water contained therein sufficiently to substantially eliminate solid-solid contact between particles, b) contacting said dry particles with a plurality of fine drops of an aqueous solution consisting essentially of a mixture of 1 to 99 parts by weight sodium silicate and from 99 to 1 parts by weight sodium metaborate, c) concomitantly evaporating substantially all this water at a sufficient rate to avoid moistening or hydrating the dry particles, thereby providing from 2% to 10% by weight coating said dry particles, and d) collecting the coated dry particles as a freeflowing peroxygen compound stable when incorporated into a solid detergent formulation. The coated particles may be recycled to step a) and thereby be provided with two or more coatings.

DETAILED DESCRIPTION

The scope of the present invention is intended to include the product made by said process.

Any composition containing dry particles comprising sodium carbonate perhydrate, with from 1 to 5 moles excess sodium carbonate (anhydrous) and 0.1% to 3% diphosphonic acid may be employed.

One skilled in the art can easily prepare a preferred nonstoichiometric sodium carbonate perhydrate composition, "Soda Ash Peroxygen Carrier", (SAPC) according to the process described in U.S. Pat. No. 4,966,762. The process comprises applying a solution of a diphosphonic acid or salt, preferably 1-hydroxyethylidene-1,1-diphosphonic acid in aqueous hydrogen peroxide to particles of anhydrous sodium carbonate, concomitantly removing water vapor from the surface of the reaction mixture, and maintaining the temperature of the reaction mixture between about 35° C. and 80° C., said diphosphonic acid or salt being present in an amount to provide 0.1% to 3% diphosphonic acid or salt in the composition thereby providing as product a soda ash peroxygen carrier containing between 1 and 5 moles of sodium carbonate for each mole of available water in the composition, said available water consisting essentially of water chemically available as hydrogen peroxide, water of crystallization and free water.

Diphosphonic acid appears to slow the rate of hydration of anhydrous sodium carbonate so that water is preferentially evaporated. However, after the product is dried, the anhydrous sodium carbonate appears to be able to form a hydrate with any water formed by the decomposition of the peroxygen. Thus pure soda ash peroxygen carrier (SAPC) is less subject to accelerated decomposition than sodium carbonate perhydrate.

Apparently, one problem with the prior art coating processes is that the sodium carbonate perhydrate decomposition process produces 1.5 moles of water for each mole of sodium carbonate perhydrate, and the coating, if impervious to vapor, prevents the water from evaporating. Consequently, the retained water accelerates the decomposition of the sodium carbonate perhydrate. On the other hand, when the coating is not impervious to water vapor, the moisture in the detergent formulation is able to contact the sodium carbonate perhydrate and initiate decomposition.

The present invention can be carried out in a fluid bed by suspending the dry particles by the fluidizing gas and applying the coating by a spray. For the purpose of this invention "suspending . . . to eliminate solid-solid contact" would include permitting particles to be separately lifted by a stream of air or to fall separately as in a tower. Alternately, the invention can be carried out in a tower and applying the coating in a countercurrent, cocurrent or radial spray. Other alternative processes will be apparent to one skilled in the art, such as a spray dryer with both liquid and solids injection, or the like.

It is critical for the present invention that the drops of aqueous solution be much smaller in diameter than the solid particles to avoid agglomerating the particles caused by wetting the surface of the dry particles, or of hydrating either the sodium carbonate perhydrate (SPC) or any sodium carbonate in the dry particles thereby forming the hydrate of SPC, $2Na_2CO_3.3H_2O.2H_2O_2$, a sodium carbonate hydrate or other hydrate. It is well known that once formed, sodium carbonate monohydrate is very difficult to dehydrate without concomitantly decomposing an active oxygen compound associated with it.

EXAMPLES

The best mode of practicing the invention will be clear to one skilled in the art from the following nonlimiting examples. Unless specified otherwise, percentages are reported as percent by weight.

STABILITY TESTS

The Quick Test is a method for determining the relative stability of similar samples (decomposition) in only eight hours. Sufficient sample is added to a closed container connected to a manometer to provide a constant volume to sample weight ratio. The temperature is maintained at 50° C. and the oxygen evolved (the increase in pressure is measured hourly and the slope of the line is reported as cm/Hg). The test can be employed for samples formulated in a detergent base or for unformulated samples of a peroxygen compound ("neat stability").

The 80/80 Open Box Test simulates the storage of an open box of a detergent formulation. Unless otherwise specified sufficient peroxygen compound to be evaluated is blended in a commercial detergent formulation to provide 0.7% active oxygen by weight. The box containing 0.45 kilograms of formulation is stored with an open lid at 26.7° C. (80° F.) and 80% relative humidity for six weeks. At two week intervals samples are selected by riffling the contents of the box. Active oxygen is determined in triplicate.

COATING PROCESS

The apparatus used for coating the dry particles was the Strea-1 Laboratory Fluid-Bed Coater, manufactured by Aeromatic, a division of Niro Industries.

The unit consists of a coating feed container, a tubing pump to dispense the coating solution and the fluid bed coater. The fluid bed coater consists of a clear outer shell for easy viewing, a grid plate to introduce the fluidizing air, and a center draft tube containing an air atomizing spray nozzle. The product introduced into the container is fluidized by a stream of preheated air from below the grid plate. The particles to be coated are recycled through the draft tube until the desired amount of coating is applied.

COATING PROCEDURE

1. Adjust the space between the grid plate and the bottom of the center tube to the specified setting.
2. Adjust the nozzle atomizing air to the desired setting by adjusting the nozzle spray cap.
3. Preheat the fluid bed apparatus to coating temperature.
4. Load the required amount of peroxygen compound into the bed coater.
5. Heat the contents using preheated air which is used to fluidize the contents at mild fluidizing velocity.
6. After the bed temperature of 38°-71° C. (100°-160° F.), preferably 48°-60° C. (120°-140° F.) is attained, increase the air atomizing rate and fluid bed velocity and start the coating application preferably at the predetermined rate.
7. During the coating application, maintain the bed temperature by adjusting the inlet air rate and temperature. Also maintain coating application rate.
8. After the required amount of coating is applied, reverse the coating pump to empty the lines of coating material back to the the feed container, deactivate the air preheater, stop the fluid air to the fluid bed and empty the contents of the container.
9. Weigh the coated material.

The coating process employed a variety of materials: sodium silicate, sodium metaborate, sodium borosilicate, sodium bicarbonate, sodium carbonate, sodium polyacrylate, polyethylene glycol and polypropylene glycol.

It is essential to avoid substantial agglomeration of particles. Agglomeration is easily measured by a decrease in bulk density. For example uncoated SApC having a bulk density of 1,025 kg/m$^3$ (64 lb/cu.ft.) should have a bulk density after coating of at least 800 kg/m$^3$ (50 lb/cu.ft.), preferably at least 880 kg/m$^3$ (55 lb/cu.ft.).

The particles are coated with 2-10% of their weight of coating compound. The single coating material may be applied or a combination either as a mixture or as multiple coats. The effect of the coating is determined by how well the coated particles maintain active oxygen (hydrogen peroxide content) in the Quick Test and Open Box Test.

Solutions of the coating compound can vary in concentration over a large range. Preferably the solutions should contain about 15% to 25% solids. Higher concentrations than 25% can be used but usually must be preheated to prevent crystallization and to permit atomization into fine droplets. More dilute solutions require a greater heat input to evaporate the water sufficiently to prevent wetting the particles being coated. With care solutions can range from about 12% solids to about 35% solids.

Typical 25% solids solution preparation is illustrated as follows:

Sodium metaborate: Add 261.8 g sodium metaborate tetrahydrate to 238.2 g water.

Sodium silicate: Add 334.4 g of a 37.4% solution of sodium silicate ($SiO_2:Na_2O$ weight ratio=3.22) to 165.8 g water.

Sodium borosilicate: A blend of above solutions (ratio 1:99 to 99:1).

The best mode of practicing the invention is exemplified employing the preferred SAPC because it will easily detect insufficient evaporation of water in step c) by the conversion of anhydrous sodium carbonate to a hydrate.

EXAMPLE 1

Soda Ash Peroxygen Carrier (SAPC) initially containing about 9.0% active oxygen was prepared using two commercial grades of sodium carbonate, FMC Corporation's Grade 100 soda ash and Grade 90 soda ash. Samples were coated and the stability was determined by the Quick Test as cm/hr. The experimental details and results are reported as Table I. The Grade 90 soda ash is more absorptive than the Grade 100.

From the Table it is clear that the type of sodium carbonate has no effect on the stability of the SAPC produced, either before or after coating. Generally, coating the SAPC decreases the decomposition rate.

EXAMPLE 2

Coated and uncoated SAPC were evaluated by the Quick Test alone (neat stability) and formulated with a commercial detergent (P&G's nonphosphate Tide). Sufficient SAPC was employed to provide 0.7% active oxygen (AO) in the formulation. The results are presented as Table II.

In comparing the decomposition rate it is important to recognize the difference in % active oxygen (AO). All "Detergent Formulations" samples initially contained 0.7% AO while the neat stability samples contained 10 to 13 times as much (from 7.0–9.4% AO).

The Table shows particles coated according to the present invention are far more stable (less decomposition) in detergent formulations than uncoated particles and comparable to the sodium perborate monohydrate of Tide with Bleach.

EXAMPLE 3

Samples of SAPC coated with sodium silicate, sodium metaborate, sodium borosilicate were evaluated in the Open Box Test. Results are presented as Table III. Commercial Tide with Bleach containing 0.7% AO as sodium perborate monohydrate was employed as a control.

From Table III it is clear that the coated samples are generally more stable than a commercial formulation containing "stable" sodium perborate monohydrate.

EXAMPLE 4

Under identical temperature and stirring conditions a SAPC coated with 2% borosilicate was 95% dissolved after 1 minute at 15° C. while a sample of sodium perborate tetrahydrate was only 30% dissolved. Even a SAPC coated with 10% borosilicate was 88% dissolved in the same time.

EXAMPLE 5

Samples of soda ash peroxygen carrier made by the process of U.S. Pat. No. 4,966,762 and a commercial sodium carbonate perhydrate containing silicate and magnesium stabilizer were coated with 2% and 10% borosilicate (about 50% sodium metaborate and 50% sodium silicate by weight). The samples were incorporated into non-phosphate Tide brand detergent to provide 0.7% active oxygen (A.O.). The stability was determined after storage for 6 weeks in the Open Box Test. Results are reported in Table IV and compared with commercial Tide with Bleach detergent and with a sample of Tide brand detergent made up with sodium perborate monohydrate.

The data show that while the coating improves the stability of the commercial sodium carbonate perhydrate samples somewhat, that the stability of the SAPC with 2% coating is unexpectedly increased about fivefold.

EXAMPLE 6

The dissolution rate of coated peroxygen compounds was compared by measuring the change of active oxygen (A.O.) with time. Sufficient peroxygen compound was added to provide a final A.O. content of 0.2% by weight; the samples were stirred at 200 rpm.

Sodium perborate monohydrate (uncoated) which is known to dissolve very rapidly was substantially all in solution within 10 seconds, while uncoated sodium perborate tetrahydrate was only 50% dissolved by 120 seconds.

Samples of SAPC coated with 2% and 4% sodium borosilicate were both substantially dissolved (90%) within 40 seconds while samples of SAPC coated with 6%, 8% and 10% were all substantially dissolved (90%) within 60 seconds. A sample of SAPC coated with 2% sodium silicate over an initial 2% sodium metaborate was only 80% dissolved after 120 seconds.

Coatings of more than 2% sodium metaborate alone agglomerated as they were too sticky to handle. This is contrary to the disclosures of Japanese Kokai 59193 999 which discloses that sodium metaborate should be employed in excess of sodium silicate when applied on sodium carbonate perhydrate (sodium percarbonate). Clearly, coating of SAPC with a combined sodium borate/sodium silicate (sodium metaborate) is far superior than coating commercial sodium percarbonate $(2NA_2CO_3 \cdot 3H_2O_2)$.

TABLE I

COMPARATIVE DECOMPOSITION RATE OF COATED AND UNCOATED SODA ASH PEROXYGEN CARRIER

| Run | FMC Grade Soda Ash | Coating % | Compound | Initial % AO | Quick Test cm/hr |
|---|---|---|---|---|---|
| 1 | 100 | — | — | 9.0 | 0.14 |
| 2 | 90 | — | — | 9.4 | 0.14 |
| 3 | 100 | 4 | Sodium Silicate | 9.0 | 0.07 |
| 4 | 100 | 10 | Sodium Silicate | 9.0 | 0.03 |
| 5 | 100 | 2 | Sodium Silicate | 9.0 | 0.09 |
| 6 | 100 | 2 | Sodium Metaborate | | |
| | | 2 | Sodium Silicate* | 9.0 | 0.06 |
| 7 | 100 | 2 | Sodium Metaborate | 9.0 | 0.27 |
| 8 | 100 | 2 | Sodium Polyacrylate | 9.0 | 0.09 |
| 9 | 100 | 2 | Sodium Borosilicate | 9.0 | 0.15 |
| 10 | 100 | 4 | Sodium Borosilicate | 9.0 | 0.06 |
| 11 | 100 | 10 | Sodium Borosilicate | 9.0 | 0.08 |
| 12 | 90 | 2 | Sodium Borosilicate | 9.4 | 0.12 |
| 13 | 90 | 4 | Sodium Borosilicate | 9.4 | 0.10 |
| 14 | 90 | 10 | Sodium Borosilicate | 9.4 | 0.12 |
| 15 | 100 | 2 | Sodium Metaborate | 9.0 | 0.09 |
| 16 | 90 | 2 | Sodium Metaborate | 9.4 | 0.12 |

*a second layer

TABLE II

COMPARISON OF DECOMPOSITION OF COATED AND UNCOATED PARTICLES (NEAT AND FORMULATED INTO A DETERGENT)

| | Neat | Detergent Formulation |
|---|---|---|

TABLE II-continued

| Run | FMC Grade | % Coating | SAPC % AO | SAPC Quick cm/hr | 0.7% AO Quick Test cm/hr |
|---|---|---|---|---|---|
| 1 | 100 | 2% NAMB | 8.7 | 0.09 | 0.02 |
| 2 | 90 | 10% BORSIL | 7.8 | 0.12 | 0.02 |
| 3 | 100 | 2% BORSIL | 8.2 | 0.15 | 0.02 |
| 4 | 90 | 2% BORSIL | 8.7 | 0.12 | 0.05 |
| 5 | 100 | 10% NASIL | 7.0 | 0.07 | 0.00 |
| 6 | 90 | 10% NASIL | 7.2 | 0.05 | 0.01 |
| 7 | 100 | 10% HMPHOS | 7.9 | 0.15 | 0.03 |
| 8 | 100 | 2% NAMB/2% NASIL* | 8.2 | 0.06 | 0.03 |
| 9 | 100 | 2% NASIL | | 0.09 | 0.05 |
| 10 | 100 | 2% NASIL/2% NAMB* | 8.4 | 0.14 | 0.03 |
| 11 | 100 | 2% POLYAC | | 0.09 | 0.03 |
| 12 | 100 | 2% POLYAC/2% NASIL* | 8.4 | 0.08 | 0.12 |
| 13 | 100 | 4% NASIL | | 0.07 | 0.03 |
| 14 | 100 | 4% NASIL | 6.9 | 0.03 | 0.00 |
| 15 | 100 | 2% NASIL/2% NAMB* | 8.1 | 0.08 | 0.04 |
| 16 | 90 | 2% NASIL/2% NAMB* | 8.8 | 0.05 | 0.03 |
| 17 | 100 | 2% NAMB/2% NASIL* | 8.4 | 0.04 | 0.04 |
| 18 | 90 | 2% NAMB/2% NASIL* | 8.5 | 0.05 | 0.01 |
| 19 | 90 | 2% NASIL/5% NAMB* | 8.0 | 0.06 | 0.01 |
| 20 | 100 | 2% NASIL/5% NAMB* | 8.3 | 0.06 | 0.01 |
| 21 | 100 | 5% NAMB/2% NASIL* | 7.6 | 0.04 | 0.02 |
| 22 | 90 | 5% NAMB/2% NASIL* | 7.7 | 0.03 | 0.03 |

COMPARISON OF DECOMPOSITION OF SAPC ALONE AND FORMULATED INTO A DETERGENT

| Run | FMC Grade | % Coating | SAPC % AO | SAPC Hills cm/hr | Detergent Formulation 0.7% AO Hills Test cm/hr |
|---|---|---|---|---|---|
| 23 | 100 | UNCOATED | 9.0 | 0.14 | 0.71 |
| 24 | 90 | UNCOATED | 9.4 | 0.14 | 0.64 |
| 25 | Tide With Bleach | | — | — | 0.05 |

Key
NAMB Sodium Metaborate
BORSIL Sodium Borosilicate
NASIL Silicate
HMPHOS Sodium Hexametaphosphate
POLYAC Polyacrylate
*indicates the second layer

OPEN BOX STABILITY OF SAPC

| Run | FMC Grade Soda Ash | % AO | Coating % Comp. | Open Box Stability % AO Retained After (in weeks) | | | | | |
|---|---|---|---|---|---|---|---|---|---|
| | | | | 1 | 2 | 3 | 4 | 5 | 6 |
| 1 | 100 | 8.8 | 2 NAMB | 93 | 72 | 80 | 64 | 55 | 57 |
| 2 | 90 | 8.84 | 10 NASIL | 100 | 72 | 62 | 67 | 58 | 56 |
| 3 | 90 | 7.93 | 10 NASIL | 93 | 74 | 65 | 54 | 41 | 38 |
| 4 | 90 | 7.8 | 10 BOROSIL | 100 | 96 | 94 | 84 | 77 | 70 |
| 5 | 100 | 8.2 | 2 BOROSIL | 94 | 74 | 61 | 75 | 74 | 73 |
| 6 | 90 | 8.7 | 2 BOROSIL | 94 | 83 | 61 | 60 | 53 | 53 |
| 7 | Tide with Bleach | | | 81 | 66 | 79 | 63 | 66 | 50 |
| 8 | Uncoated 100 | 9.0 | | 57 | 30 | 29 | — | — | — |
| 9 | Uncoated 90 | 9.0 | | 51 | 24 | 19 | — | — | — |

TABLE IV
STABILITY OF SCP IN DETERGENT FORMULATION

| Sample | % Coat | % AO | 6 weeks |
|---|---|---|---|
| SAPC | 2% Borosil | 8.6 | 53 |
| SAPC | 10% Borosil | 9.4 | 70 |
| SAPC | None | 9.0 | 9 |
| PERC | None | 13.6 | 19 |
| PERC | 2% Borosil | 13.3 | 37 |
| PERC | 10% Borosil | 11.8 | 57 |
| Tide W/Bleach | | | 50 |
| Tide + SPBM | | 15.2 | 78 |

Borosil = sodium borosilicate
SPBM = sodium perborate monohydrate
SAPC = soda ash peroxygen carrier
PERC = commercial sodium carbonate perhydrate with silicate/magnesium stabilizer All test samples contain 0.7% A.O. in nonphosphorus Tide.

We claim:
1. A process for preparing a storage-stable compound characterized by:
a) suspending substantially dry particles comprising sodium carbonate perhydrate containing 0.1% to 3% by weight of a diphosphonic acid or salt and between 1 and 5 moles of anhydrous sodium carbonate for each mole of available water contained therein sufficiently to substantially eliminate solid-solid contact between particles,
b) contacting said dry particles with a plurality of fine drops of an aqueous solution consisting essentially of 10% to 90% by weight sodium silicate and 90% to 10% by weight sodium metaborate (sodium borosilicate), c) concomitantly maintaining dry particles at a temperature of from 38° C. to 71° C., thereby evaporating water at a sufficient rate to avoid moistening or hydrating said dry particles thereby coating the particles with from 2% to 10% by weight of the sodium borosilicate, and d) collecting the coated dry particles as a freeflowing peroxygen compound which is stable when incorporated into a solid detergent formulation.

2. The process of claim 1 wherein the aqueous solution consists essentially of 15% to 35% solids, the solids consisting of 25% to 75% by weight sodium silicate and 75% to 25% by weight sodium metaborate.

3. The product made by the process of claim 1.

4. The product made by the process of claim 1 further characterized by having a bulk density of at least 800 kg/m$^3$.

* * * * *